(12) United States Patent
Chang (10) Patent No.: US 9,319,314 B2
(45) Date of Patent: Apr. 19, 2016

(54) APPARATUS AND METHOD FOR USING LINK-TAIL OF LINK LIST TO STORE DATA PATTERN WHICH IS INDICATIVE OF END OF LINK LIST AND AUXILIARY INFORMATION

(71) Applicant: MEDIATEK INC., Hsin-Chu (TW)

(72) Inventor: Chien-Hsiung Chang, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 299 days.

(21) Appl. No.: 14/176,133

(22) Filed: Feb. 9, 2014

(65) Prior Publication Data

US 2014/0321465 A1 Oct. 30, 2014

Related U.S. Application Data

(60) Provisional application No. 61/816,243, filed on Apr. 26, 2013.

(51) Int. Cl.
*H04L 12/741* (2013.01)
*H04L 12/863* (2013.01)

(52) U.S. Cl.
CPC ............... *H04L 45/74* (2013.01); *H04L 47/62* (2013.01)

(58) Field of Classification Search
CPC ... H04L 45/74; H04L 47/62; G06F 17/30958; G06F 2205/064
USPC ............... 370/392; 707/800, E17.011
See application file for complete search history.

(56) References Cited

U.S. PATENT DOCUMENTS

| 5,778,000 A * | 7/1998 | Dosiere | H04L 7/042 370/509 |
| 6,604,167 B1 * | 8/2003 | Blandy | G06F 9/45516 711/100 |
| 2009/0313418 A1 * | 12/2009 | Ross | G06F 12/0246 711/103 |
| 2010/0192050 A1 * | 7/2010 | Burbridge | G11B 20/18 714/807 |

OTHER PUBLICATIONS

Aumann, Y.; Bender, M.A., "Fault tolerant data structures," in Foundations of Computer Science, Oct. 14-16, 1996.,Proceedings., 37th Annual Symposium on, pp. 580-589, doi: 10.1109/SFCS.1996.548517.*
Coreman, A; Leiserson, C; Rivest, R; Stein, C; "Linked Lists" in Introduction to Algorithms, $2^{nd}$ Edition, 2001, McGraw Hill Book Company, pp. 204-209.*

* cited by examiner

*Primary Examiner* — Mark Rinehart
*Assistant Examiner* — Kenneth P Hunt
(74) *Attorney, Agent, or Firm* — Winston Hsu; Scott Margo (57) ABSTRACT

A link list processing apparatus has a storage device and a link list controller. The link list controller sets link list information, and writes the link list information into the storage device to create a link list in the storage device. The link list has a plurality of nodes each having a next node address field. The link list information includes a data pattern configured to indicate an end of the link list as well as auxiliary information. The link list controller stores the data pattern into the next node address field of a link-tail node of the link list.

23 Claims, 7 Drawing Sheets

APPARATUS AND METHOD FOR USING LINK-TAIL OF LINK LIST TO STORE DATA PATTERN WHICH IS INDICATIVE OF END OF LINK LIST AND AUXILIARY INFORMATION

CROSS REFERENCE TO RELATED APPLICATIONS

This application claims the benefit of U.S. provisional application No. 61/816,243, filed on Apr. 26, 2013 and incorporated herein by reference.

BACKGROUND

The disclosed embodiments of the present invention relate to a link list data structure, and more particularly, to an apparatus and method for using a link-tail of a link list to store a data pattern which is indicative of an end of the link list as well as auxiliary information.

A network switch is a computer networking device that links different network devices. For example, the network switch receives an incoming packet generated from a first network device connected to it, and transmits a modified packet or an unmodified packet derived from the received packet only to a second network device for which the received packet is meant to be received. In general, the received packet is composed of a plurality of data chunks (i.e., a plurality of cell data). Thus, the packet derived from the received packet is also composed of a plurality of data chunks (i.e., a plurality of cell data). The network switch has a packet buffer for buffering data chunks of the derived packet. However, the free storage space available in the packet buffer is not guaranteed to be continuous. As a result, the data chunks of the derived packet may be randomly located in the packet buffer after stored into the packet buffer.

To efficiently manage the data chunks of the derived packet in the packet buffer, a link list may be employed by the network switch. Based on the link list data structure, the link list includes a plurality of nodes concatenated in series, where each node is associated with one of the data chunks of the derived packet in the packet buffer, and has a next node address field used to store an address of a next node. Concerning a link-tail node of the link list, since the link-tail node is the last node of the link list, there is no next node concatenated to the link-tail node. Hence, in a conventional design, the next node address field of the link-tail node would store a null pointer which points to a null address, thereby informing a packet transmitting circuit of the end of the link list when the link list is read by the packet transmitting circuit during the packet transmission. As the link-tail node points to the "null", the next node address field of the link-tail node is wasted.

SUMMARY

In accordance with exemplary embodiments of the present invention, an apparatus and method for using a link-tail of a link list to store a data pattern which is indicative of an end of the link list as well as auxiliary information are proposed to solve the above-mentioned problem.

According to a first aspect of the present invention, an exemplary link list processing apparatus is disclosed. The exemplary link list processing apparatus includes a storage device and a link list controller. The link list controller is arranged to set link list information and write the link list information into the storage device to create a link list in the storage device. The link list comprises a plurality of nodes each having a next node address field. The link list information includes a data pattern configured to indicate an end of the link list as well as auxiliary information. The link list controller stores the data pattern into the next node address field of a link-tail node of the link list.

According to a second aspect of the present invention, an exemplary link list processing method is disclosed. The exemplary link list processing method includes at least the following steps: setting link list information, wherein the link list information includes a data pattern configured to indicate an end of a link list as well as auxiliary information; and writing the link list information into a storage device to create the link list in the storage device, wherein the link list comprises a plurality of nodes each having a next node address field, and the data pattern is written into the next node address field of a link-tail node of the link list.

According to a third aspect of the present invention, an exemplary network switch is disclosed. The exemplary network switch includes a packet receiving circuit, a link list processing apparatus, and a packet transmitting circuit. The packet receiving circuit is arranged for receiving an input packet and deriving a plurality of first data chunks from the received input packet. The link list processing apparatus includes a storage device and a link list controller. The link list controller is arranged to write link list information into the storage device to create a link list in the storage device, wherein the link list comprises a plurality of nodes associated with the first data chunks respectively, each node has a next node address field, the link list information includes a data pattern configured to indicate an end of the link list as well as auxiliary information, and the link list controller stores the data pattern into the next node address field of a link-tail node of the link list. The packet transmitting circuit is arranged for deriving a plurality of second data chunks of an output packet from the first data chunks according to the link list, and transmitting the output packet, wherein the packet transmitting circuit refers to the auxiliary information indicated by the link-tail node to perform packet processing when generating the output packet.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to use the next node address field of the link-tail node to store auxiliary information. Hence, besides indicating the end of the link list, the link-tail node also provides additional information (e.g., control information or data information) associated with packet processing of an output packet. To put it simply, the present invention proposes shared link-tail architecture to fully use a storage space occupied by the link-tail node, thus saving the additional storage space originally required for buffering the packet processing related information (e.g., control information or data information). Further details of the shared link-tail architecture are described as below.

Figure 1:
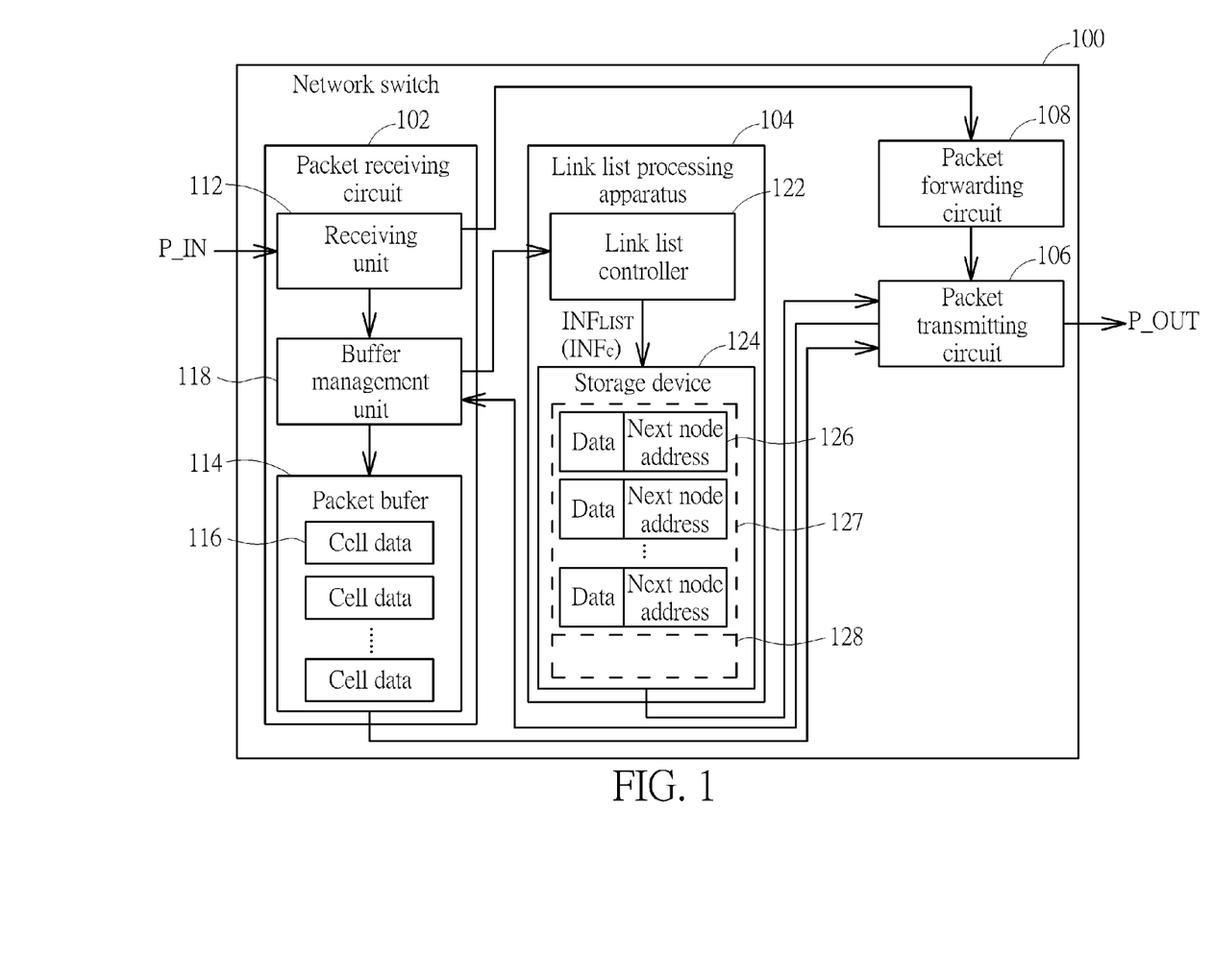
FIG. 1 is a diagram illustrating a network switch according to an embodiment of the present invention.

FIG. 1 is a diagram illustrating a network switch according to an embodiment of the present invention. The network switch 100 is an Internet/Intranet device, and includes a packet receiving circuit 102, a link list processing apparatus 104 coupled to the packet receiving circuit 102, a packet transmitting circuit 106 coupled to both of packet receiving circuit 102 and link list processing apparatus 104, and a packet forwarding circuit 108 coupled between the packet receiving circuit 102 and the packet transmitting circuit 106. The packet receiving circuit 102 includes a receiving unit 112, a packet buffer 114, and a buffer management unit 118. The link list processing apparatus 104 includes a link list controller 122 and a storage device 124. It should be noted that only the components pertinent to the present invention are shown in FIG. 1. In practice, the network switch 100 may include additional components to support other function(s). The receiving unit 112 is arranged to receive an input packet P_IN generated from a source network device connected to the network switch 100, and derives a plurality of data chunks (cell data) 116 from the received input packet P_IN. By way of example, the input packet P_IN is composed of the data chunks 116 that are successively received by the receiving unit 112, where each data chunk 116 carries one cell data. The buffer management unit 118 is arranged to manage the buffer storage space of the packet buffer 114. For example, the buffer management unit 118 allocates a free storage space in the packet buffer 114 to a received packet data chunk, and releases a used storage space in the packet buffer 114 that is occupied by a transmitted packet data chunk. Thus, when the receiving unit 112 receives a data chunk of the input packet P_IN, one free storage space is dynamically allocated in the packet buffer 114 by the buffer management unit 118, and the received data chunk is stored into the allocated free storage space by the receiving unit 112. In this embodiment, no modification is made to the received data chunk before the received data chunk is stored into the packet buffer 114.

The buffer management unit 118 further transmits the location information of the allocated storage space to the link list controller 122. The link list controller 122 also has a storage management capability. Based on the location information of the allocated storage space in which the data chunk is stored, the link list controller 122 allocates one storage space in the storage device 124, and stores information into the allocated storage space to create one node 126 of a link list that is associated with the received data chunk stored in the packet buffer 114. In this embodiment, there is a one-to-one mapping relationship between the data chunks 116 stored in the packet buffer 114 and the nodes 126 of the link list created in the storage device 124. In other words, the data chunks derived from the input packet P_IN and stored in the packet buffer 114 are associated with nodes of the link list created and stored in the storage device 124, respectively. Hence, by traversing the link list from the link-head node (i.e., the first node) to the link-tail node (i.e., the last node), the data chunks randomly stored in the packet buffer 114 can be orderly retrieved by the packet transmitting circuit 106 to obtain a plurality of data chunks of an output packet P_OUT. Besides, the packet forwarding circuit 108 gets packet data of the input packet P_IN from the receiving unit 112, and provides the packet destination information to the packet transmitting circuit 106. Next, the packet transmitting circuit 106 transmits the output packet P_OUT to a destination network device connected to the network switch 100.

After a data chunk of the output packet P_OUT is successfully transmitted to the destination network device, one used storage space in the packet buffer 114 that is occupied by the transmitted data chunk can be released. Thus, the buffer management unit 118 regards the storage space originally allocated to the transmitted data chunk of the output packet P_OUT as one free storage space.

As shown in FIG. 1, the link list node structure has a data field and a next node address field. The data field of each node 126 may be empty, depending upon actual design consideration. In this embodiment, the next node address field of each node 126 is designed to record an address of the next node. Thus, the link list stored in the storage device 124 may be configured to have one node linked to a single next node. The link list controller 122 sets the link list information $INF_{LIST}$ stored into the storage device 124, where the link list information $INF_{LIST}$ may include a data pattern $INF_C$ configured to indicate an end of the link list as well as auxiliary information (e.g., control information), and the link list controller 122 stores the data pattern $INF_C$ into the next node address field of the link-tail node of the link list. In this way, when the data pattern $INF_C$ is read from the link-tail node by the packet transmitting circuit 106, the packet transmitting circuit 106 not only identifies the current node as the last node of the link list, but also gets the control information. The packet transmitting circuit 106 refers to the auxiliary information (e.g., control information) indicated by the link-tail node to perform packet processing (e.g., adding an error packet) when generating the output packet P_OUT.

As shown in FIG. 1, the storage device 124 comprises at least a first storage space 127 allocated in a first address range and a second storage space 128 allocated in a second address range. Therefore, not all of the storage space of the storage device 124 is used for storing link lists. The link list controller 122 is arranged to store any link list into the first storage space 127 only. Please note that the data pattern $INF_C$ is not a null pointer which points to a null address beyond an address range of the storage device 124 (e.g., the first address range and the second address range). In this embodiment, the data pattern $INF_C$ has a bit pattern identical to one of addresses within the second storage space 128. That is, in contrast to a null pointer which uses a null address (i.e., an address not existing in the storage device 124), the data pattern $INF_C$ is set by a bit pattern equal to a non-used address of the storage device 124. As the packet transmitting circuit 106 knows that any link list should be stored in the first storage space 127, the link-tail node can be easily identified by the packet transmitting circuit 106 when the bit pattern stored in the next node address field is beyond the first address range of the first storage space 127. Besides, when detecting that the bit pattern stored in the next node address field of the link-list node is a non-used address within the second address range of the second storage space 128, the packet transmitting circuit 106 further gets the control information from the link-list node. For example, the control information is to indicate a reception error of a data chunk of the input packet P_IN that is associated with the link-tail node.

Figure 2:
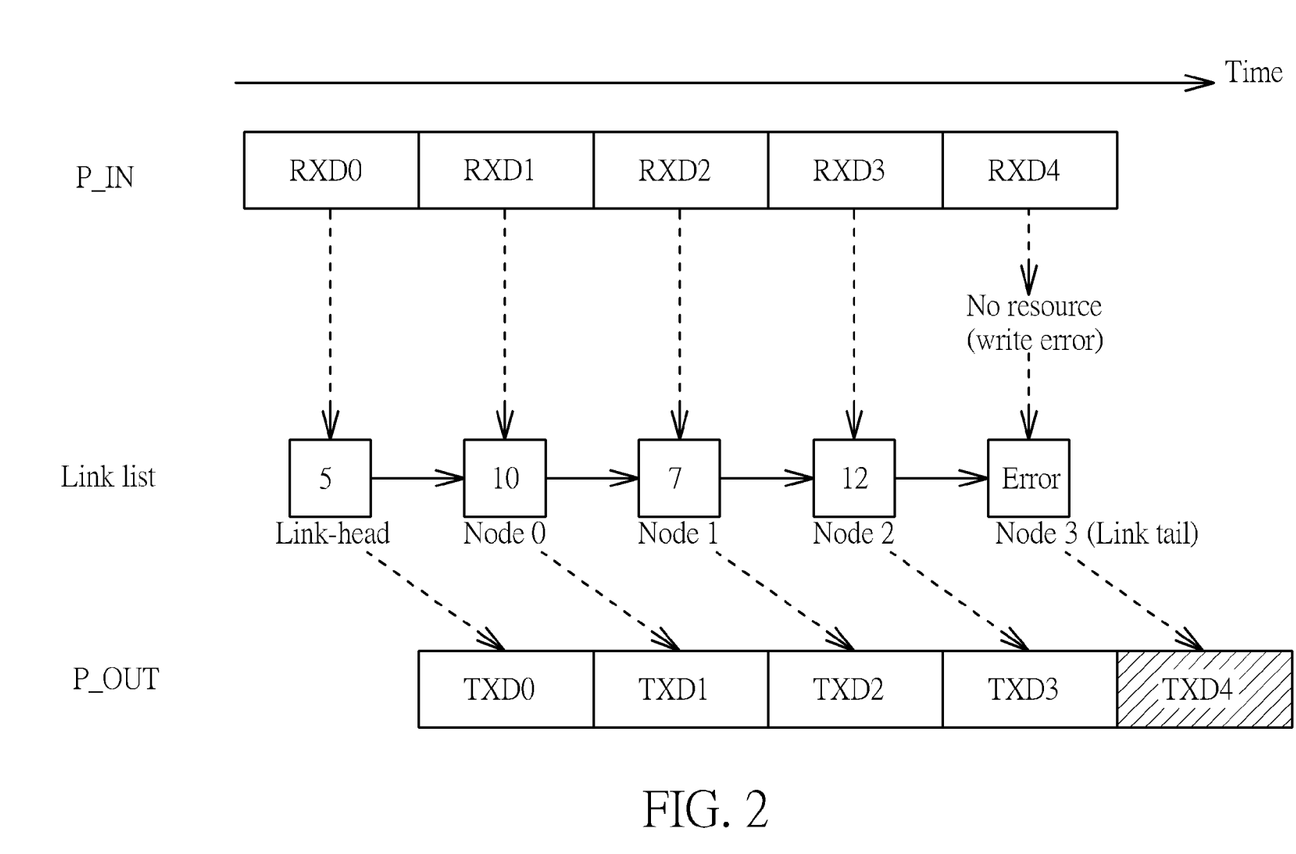
FIG. 2 is a diagram illustrating an operational scenario of the network switch shown in FIG. 1 according to an embodiment of the present invention.
Figure 3:
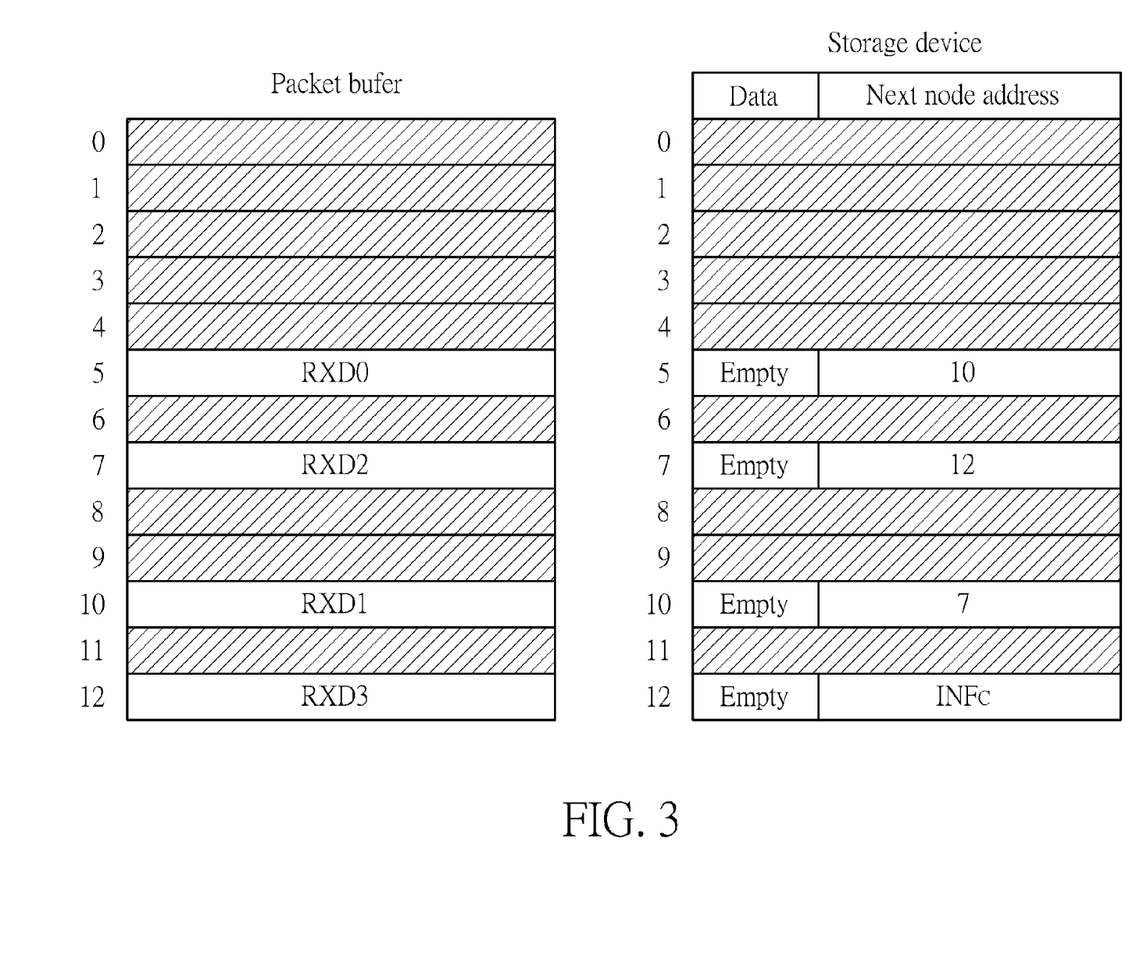
FIG. 3 is a diagram illustrating data storage statuses of the packet buffer and the storage device shown in FIG. 1.

Please refer to FIG. 2 in conjunction with FIG. 3. FIG. 2 is a diagram illustrating an operational scenario of the network switch 100 shown in FIG. 1 according to an embodiment of the present invention. FIG. 3 is a diagram illustrating data storage statuses of the packet buffer 114 and the storage device 124 shown in FIG. 1. By way of example, but not limitation, the input packet P_IN is a cut-through packet generated from a source network device connected to the network switch 100. Hence, the network switch 100 starts transmitting data chunks (cell data) of the output packet P_OUT to a destination network device connected to the network switch 100 before all of the data chunks (cell data) of the input packet P_IN have been received. As shown in FIG. 2, the receiving unit 112 of the packet receiving circuit 102 receives the data chunks (cell data) RXD0-RXD4 of the input packet P_IN sequentially. When the receiving unit 112 receives the first cell data RXD0 and the packet buffer 114 has free storage spaces at addresses 5, 10, 7 and 12, the receiving unit 112 stores the first cell data RXD0 into the storage space at address 5 of the packet buffer 114, and the link list controller 122 therefore uses the storage space at address 5 of the storage device 124 to create a link-head node. After the first cell data RXD0 is stored into the packet buffer 114, the packet transmitting circuit 106 immediately reads the first cell data RXD0 from the packet buffer 114, and transmits it as the first data chunk (cell data) TXD0 of the output packet P_OUT (i.e., RXD0=TXD0).

When the receiving unit 112 receives the second cell data RXD1 and the packet buffer 114 has free storage spaces at addresses 10, 7 and 12, the receiving unit 112 stores the second cell data RXD1 into the storage space at address 10 of the packet buffer 114, and the link list controller 122 therefore uses the storage space at address 10 of the storage device 124 to create a node 0, and stores the address 10 into the next node address field of the link-head node such that the link-head node is linked to the node 0. Similarly, after the second cell data RXD1 is stored into the packet buffer 114, the packet transmitting circuit 106 immediately reads the second cell data RXD1 from the packet buffer 114, and transmits it as the second data chunk (cell data) TXD1 of the output packet P_OUT (i.e., RXD1=TXD1).

Regarding the following two cell data RXD2 and RXD3, the receiving unit 112 and the link list controller 122 performs the above-mentioned procedure. Hence, the third cell data RXD2 is stored in the storage space at address 7 of the packet buffer 114, and the fourth cell data RXD3 is stored in the storage space at address 12 of the packet buffer 114. In the storage device 124, nodes 1 and 2 are stored in addresses 7 and 12, where node 1 is linked to node 2, and node 2 is linked to node 3.

When the receiving unit 112 receives the fifth cell data RXD4, the packet buffer 114 has no free storage spaces available for buffering the fifth cell data RXD4. Hence, a write error occurs due to lack of enough storage resource. The receiving unit 112 does not store the received fifth cell data RXD4 into the packet buffer 114. The link list controller 122 writes a data pattern $INF_C$ (e.g., control information) into the next node address field of the node 3, such that the node 3 is set to be the link-tail node and also indicates the reception error of a data chunk of the input packet P_IN (i.e., reception error of the fifth cell data RXD4). When the packet transmitting circuit 106 reads the data pattern $INF_C$ from the next node address field of the node 3, it will know that the packet is truncated. In this embodiment, the packet transmitting circuit 106 appends a predetermined error data chunk TXD4 to the output packet P_OUT. When a packet receiving circuit located at the destination network device receives the output packet P_OUT generated from the network switch 100, it will drop this incomplete packet.

In above embodiment, the data pattern stored into the next node address field of the link-tail node is to indicate the end of the link list as well as auxiliary information which is set by control information. However, this is for illustrative purposes only. In an alternative design, the data pattern stored into the next node address field of the link-tail node may be used to indicate the end of the link list as well as auxiliary information which is set by data information.

Figure 4:
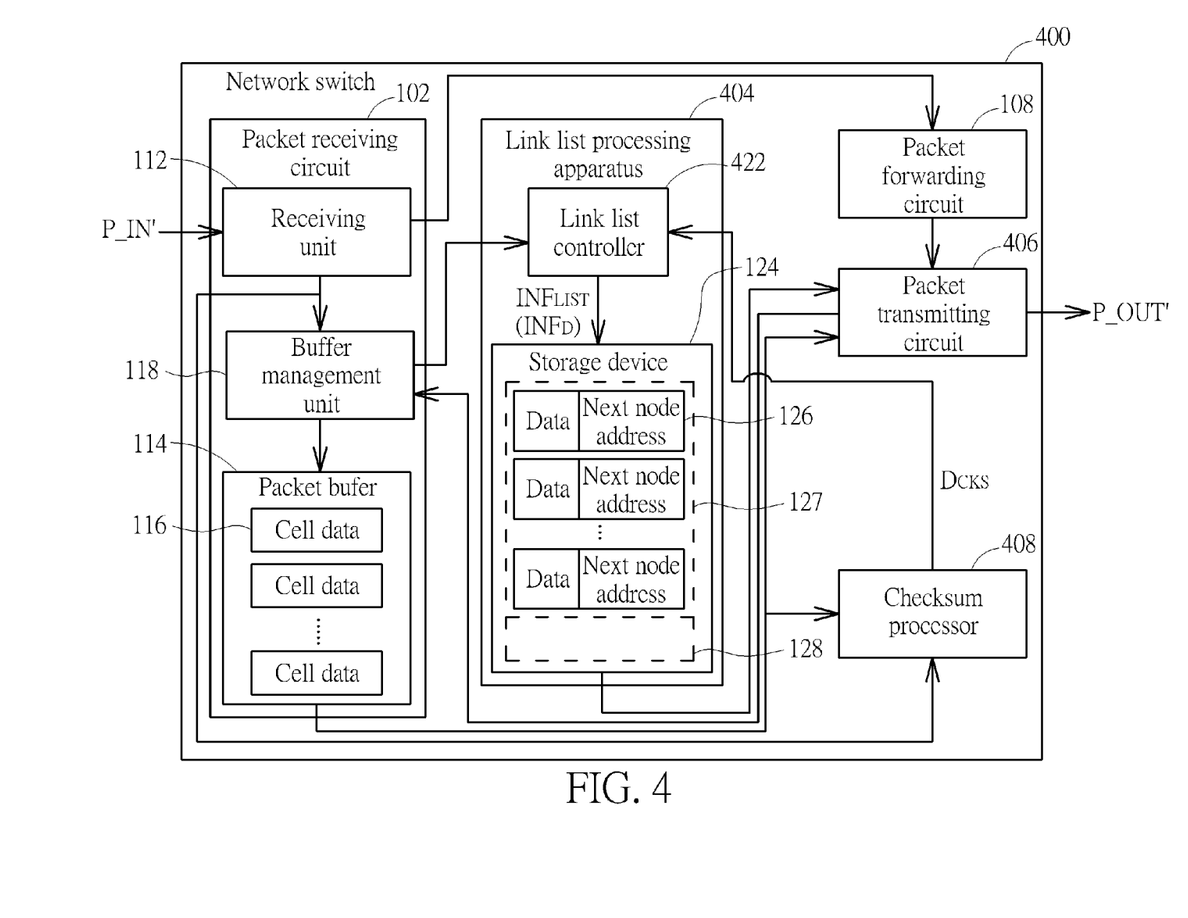
FIG. 4 is a diagram illustrating a network switch according to another embodiment of the present invention.

Please refer to FIG. 4, which is a diagram illustrating a network switch according to another embodiment of the present invention. The structure of the network switch 400 is similar to that of the network switch 100 shown in FIG. 1. The major difference between the network switches 100 and 400 is that the network switch 400 further includes a checksum processor 408, the link list controller 422 of the link list processing apparatus 404 is arranged to store a data pattern $INF_D$, including data information (e.g., a checksum $D_{CKS}$ generated from the checksum processor 408), into a next node address field of a link-tail node of a link list, and the packet transmitting circuit 406 performs checksum calculation to verify correctness of an output packet P_OUT' based on the checksum $D_{CKS}$ read from the link-tail node. For example, the checksum processor 408 calculates the checksum $D_{CKS}$ of modified data chunks (cell data) derived from original data chunks (cell data) of the input packet P_IN' and stored in the packet buffer 114, where the data chunks derived from the input packet P_IN' and stored in the packet buffer 114 are associated with nodes of the link list created and stored in the storage device 124. Regarding the packet transmitting circuit 406, it refers to the auxiliary information (e.g., data information) indicated by the link-tail node to perform packet processing (e.g., checksum verification) when generating the output packet P_OUT'.

Figure 5:
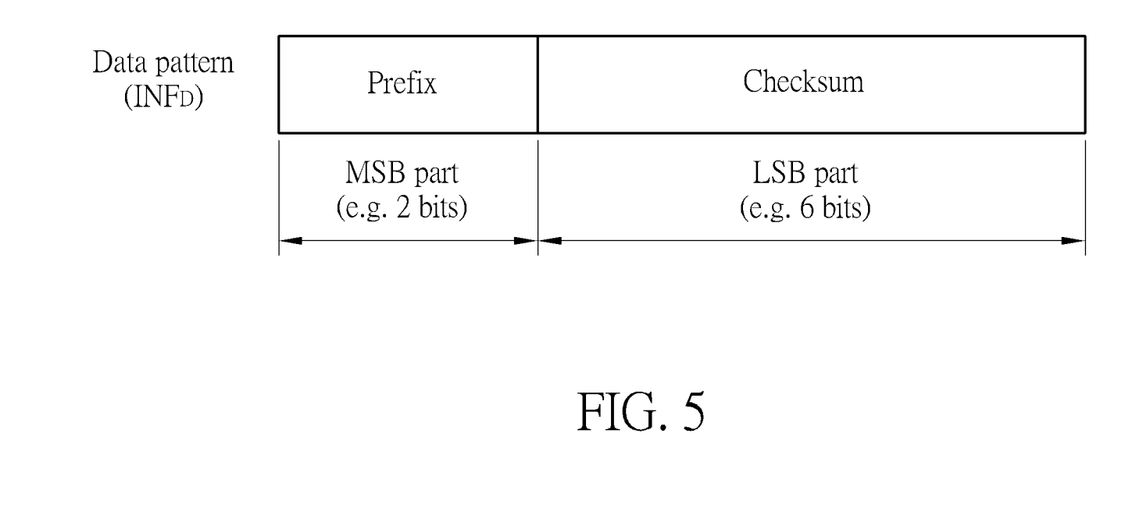
FIG. 5 is a diagram illustrating a data pattern generated from the link list controller shown in FIG. 4 according to an embodiment of the present invention.

As mentioned above, the storage device 124 has at least the first storage space 127 allocated in the first address range and the second storage space 128 allocated in the second address range. Similarly, the link list controller 422 is arranged to store any link list into the first storage space 127 only since not all of the storage space of the storage device 124 is dedicated to storing link lists. Please note that the data pattern $INF_D$ is not a null pointer which points to a null address beyond an address range of the storage device 124 (e.g., the first address range and the second address range). Please refer to FIG. 5, which is a diagram illustrating the data pattern $INF_D$ generated from the link list controller 422 according to an embodiment of the present invention. In this embodiment, the data pattern $INF_D$ has a more significant bit (MSB) part and a less significant bit (LSB) part, where the LSB part serves as a checksum, and the MSB part serves as a prefix of the checksum. More specifically, the link list controller 422 sets the MSB part of the data pattern $INF_D$ to indicate the end of the link list, and sets the LSB part by the checksum $D_{CKS}$ generated from the checksum processor 408. Suppose that the size of the next node address field is 8 bits. If the next node address field of the link-tail node is fully loaded with a 8-bit checksum, it is possible that the packet transmitting circuit 406 is unable to distinguish between a 8-bit used address within the first address range of the first storage space 127 and a 8-bit checksum generated by the checksum processor 408 due to the fact that the bit pattern of the 8-bit checksum may be identical to one of the 8-bit addresses within the first address range. Hence, the prefix is particularly designed to indicate the end of the link list. For example, the prefix has two bits, and the checksum will be 6 bits instead of 8 bits. Consider a case where the first address range of the first storage space 127 is from 0x00000000 to 0x100000000, and the second address range of the second storage space 128 is from 0x10000001 to 0x11111111. Therefore, a used address of each node in the link list would be one of the addresses from 0x00000000 to 0x100000000. As the 6-bit checksum may be set by one of bit patterns from 0x000000 to 0x111111, the 2-bit prefix is intentionally set by 0x11 to ensure that the data pattern $INF_D$ has an 8-bit bit pattern different from any address within the first address range (i.e., 0x00000000 to 0x100000000). In other words, the link list controller 422 sets the MSB part of the data pattern $INF_D$ to be different from a co-located MSB part of each address within the first address range of the first storage space 127.

Figure 6:
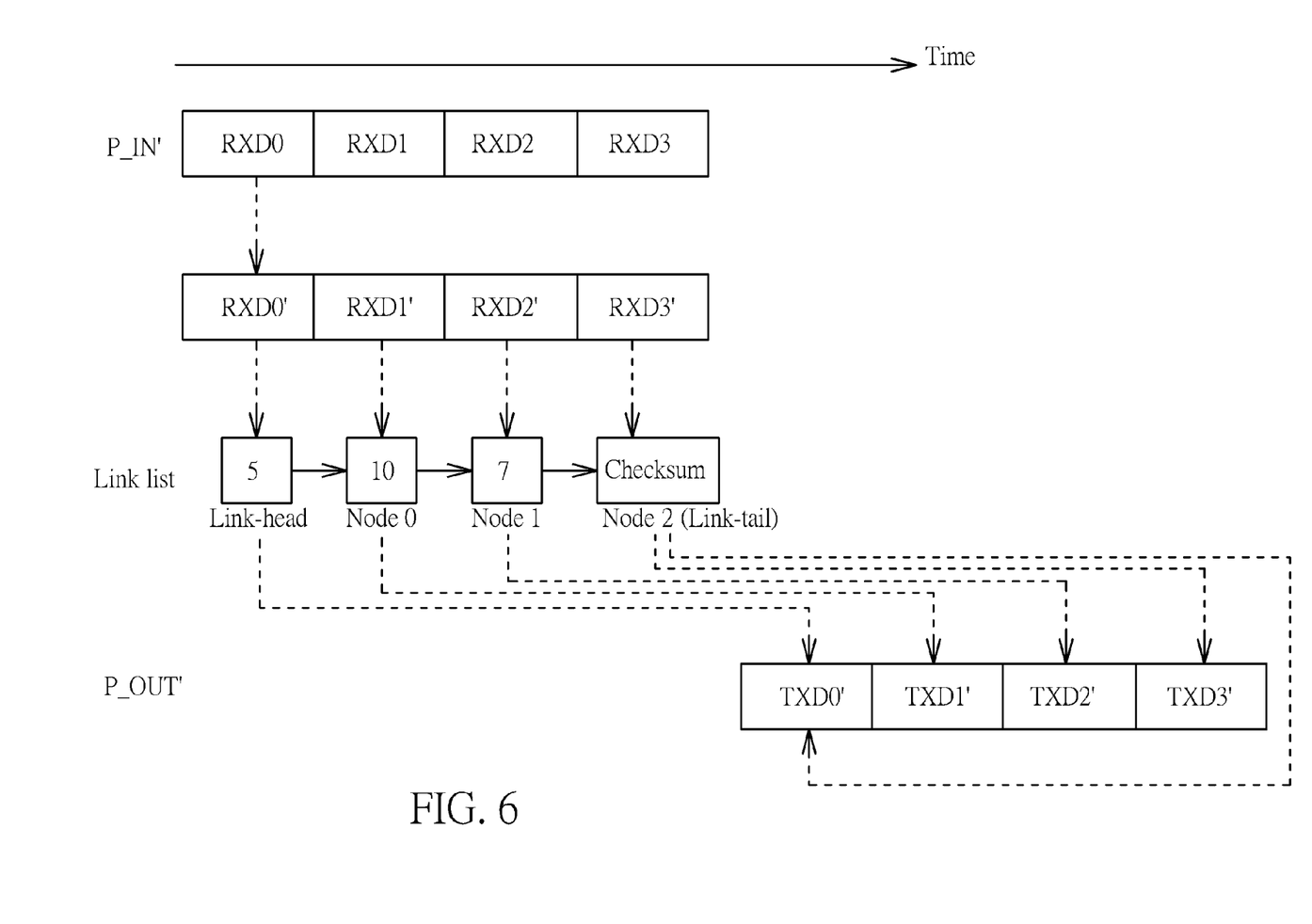
FIG. 6 is a diagram illustrating an operational scenario of the network switch shown in FIG. 4 according to an embodiment of the present invention.
Figure 7:
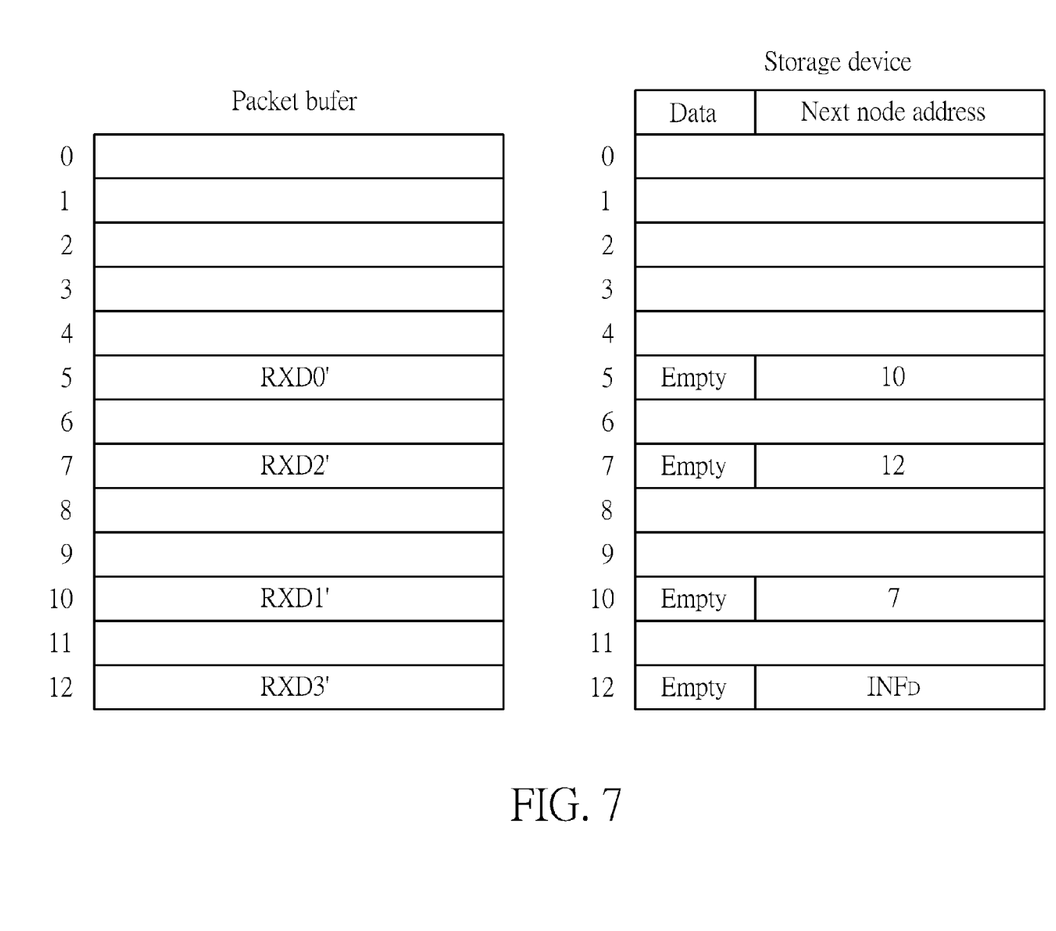
FIG. 7 is a diagram illustrating data storage statuses of the packet buffer and the storage device shown in FIG. 4.

Please refer to FIG. 6 in conjunction with FIG. 7. FIG. 6 is a diagram illustrating an operational scenario of the network switch 400 shown in FIG. 4 according to an embodiment of the present invention. FIG. 7 is a diagram illustrating data storage statuses of the packet buffer 114 and the storage device 124 shown in FIG. 4. By way of example, but not limitation, the input packet P_IN' is a store-and-forward packet generated from a source network device connected to the network switch 400. Hence, the network switch 400 starts transmitting data chunks (cell data) of the output packet P_OUT' to a destination network device connected to the network switch 100 after all of the data chunks (cell data) of the input packet P_IN' have been received. As shown in FIG. 6, the receiving unit 112 of the packet receiving circuit 102 receives the data chunks (cell data) RXD0-RXD3 of the input packet P_IN' sequentially, and store corresponding modified data chunks (cell data) RXD0'-RXD3' into storage spaces at addresses 5, 10, 7 and 12 of the packet buffer 114 sequentially. For example, the modified data chunk may be generated by modifying cell data, including a source IP address, a TCP source port, etc., in the original data chunk of the input packet P_IN.

When the first modified cell data RXD0' is stored into the storage space at the address 5 of the packet buffer 114, the link list controller 422 uses the storage space at address 5 of the storage device 124 to create a link-head node. When the second modified cell data RXD1' is stored into the storage space at the address 10 of the packet buffer 114, the link list controller 422 uses the storage space at address 10 of the storage device 124 to create a node 0, and stores the address 10 into the next node address field of the link-head node such that the link-head node is linked to the node O. When the third modified cell data RXD2' is stored into the storage space at the address 7 of the packet buffer 114, the link list controller 422 uses the storage space at address 7 of the storage device 124 to create a node 1, and stores the address 7 into the next node address field of the node 0 such that the node 0 is linked to the node 1. When the fourth modified cell data RXD3' derived from the last cell data of the input packet P_IN' is stored into the storage space at the address 12 of the packet buffer 114, the link list controller 422 uses the storage space at address 12 of the storage device 124 to create a node 3 serving as the link-tail node.

When the receiving unit 112 stores the modified data chunks (cell data) RXD0'-RXD3' into the packet buffer 114 sequentially, the receiving unit 112 also sends the modified data chunks (cell data) RXD0'-RXD3' to the checksum processor 408 sequentially. In this way, the checksum processor 408 calculates and updates the checksum upon receiving one modified data chunk (cell data). Therefore, when the fourth modified cell data RXD4' is received by the checksum processor 408, the checksum processor 408 generates the final checksum $D_{CKS}$ for all of the modified data chunks (cell data) derived from the input packet P_IN'. When the fourth modified cell data RXD4' derived from the last cell data of the input packet P_IN' is stored into the storage space at the address 12 of the packet buffer 114, the link list controller 422 sets the LSB part of the data pattern $INF_D$ by the checksum $D_{CKS}$, and stores the data pattern $INF_D$, including the MSB part set by the prefix "0x11" and the LSB part set by the checksum $D_{CKS}$, into the next node address field of the link-tail node at the address 12 of the storage device 124.

Since all of the data chunks (cell data) RXD0-RXD3 of the input packet P_IN' have been received by the packet receiving circuit 102, the packet transmitting circuit 406 is allowed to generate and transmit the output packet P_OUT' based on the modified data chunks (cell data) RXD0'-RXD3'. The packet transmitting circuit 406 refers to the link list stored in the storage device 124 to sequentially read the modified data chunks (cell data) RXD0'-RXD3' from the packet buffer 114 and store in the local FIFO for verifying the checksum. Then, the packet transmitting circuit 406 reads the checksum $D_{CKS}$ from the next node address field of the link-tail node and verifies the checksum. If the checksum is correct, then the packet transmitting circuit 406 sequentially transmits them as the data chunks (cell data) TXD0-TXD3 of the output packet P_OUT' (i.e., RXD0'=TXD0, RXD1'=TXD1, RXD2'=TXD2, and RXD3'=TXD3). If the checksum is not correct, the packet transmitting circuit 406 will discard the data.

In above embodiments, the proposed link-list architecture is employed in the network switch 100/400 for using the shared link-tail node to indicate control information (e.g., write error information) or data information (e.g., a checksum). However, this is for illustrative purposes only, and is not meant to be a limitation of the present invention. That is, any electronic device using the proposed link-list architecture falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A link list processing apparatus, comprising:
   a storage device; and
   a link list controller, arranged to set link list information and write the link list information into the storage device to create a link list in the storage device;
   wherein the link list comprises a plurality of nodes each having a next node address field, the link list information includes a data pattern configured to indicate an end of the link list as well as auxiliary information, and the link list controller stores the data pattern into the next node address field of a link-tail node of the link list.

2. The link list processing apparatus of claim 1, wherein the data pattern is not a null pointer which points to a null address.

3. The link list processing apparatus of claim 1, wherein the storage device comprises at least a first storage space allocated in a first address range and a second storage space allocated in a second address range, the link list controller is arranged to store any link list into the first storage space only, and the data pattern has a bit pattern identical to one of addresses within the second storage space.

4. The link list processing apparatus of claim 1, wherein the auxiliary information is control information.

5. The link list processing apparatus of claim 4, wherein the control information indicates a reception error of a data chunk associated with the link-tail node.

6. The link list processing apparatus of claim 5, wherein when there is no resource available for buffering the data chunk, the link list controller generates write error information as the data pattern and stores the write error information into the next node address field of the link-tail node.

7. The link list processing apparatus of claim 1, wherein the auxiliary information is data information.

8. The link list processing apparatus of claim 7, wherein the data information is a checksum of data chunks respectively associated with the nodes of the link list.

9. The link list processing apparatus of claim 8, wherein the data pattern has a more significant bit (MSB) part and a less significant bit (LSB) part, the link list controller is arranged to set the MSB part to indicate the end of the link list, and set the LSB part by the checksum.

10. The link list processing apparatus of claim 9, wherein the storage device comprises at least a first storage space allocated in a first address range and a second storage space allocated in a second address range, the link list controller is arranged to store any link list into the first storage space only, and the MSB part of the data pattern is different from a co-located MSB part of each address within the first address range.

11. A link list processing method, comprising:
setting link list information, wherein the link list information includes a data pattern configured to indicate an end of a link list as well as auxiliary information; and
writing the link list information into a storage device to create the link list in the storage device;
wherein the link list comprises a plurality of nodes each having a next node address field, and the data pattern is written into the next node address field of a link-tail node of the link list.

12. The link list processing method of claim 11, wherein the data pattern is not a null pointer which points to a null address.

13. The link list processing method of claim 11, wherein the storage device comprises at least a first storage space allocated in a first address range and a second storage space allocated in a second address range, any link list is stored into the first storage space only, and the data pattern has a bit pattern identical to one of addresses within the second storage space.

14. The link list processing method of claim 11, wherein the auxiliary information is control information.

15. The link list processing method of claim 14, wherein the control information indicates a reception error of a data chunk associated with the link-tail node.

16. The link list processing method of claim 15, wherein the step of setting the link list information comprises:

when there is no resource available for buffering the data chunk, setting write error information as the data pattern such that the write error information is stored into the next node address field of the link-tail node.

17. The link list processing method of claim 11, wherein the auxiliary information is data information.

18. The link list processing method of claim 17, wherein the data information is a checksum of data chunks respectively associated with the nodes of the link list.

19. The link list processing method of claim 18, wherein the data pattern has a more significant bit (MSB) part and a less significant bit (LSB) part, and the step of setting the link list information comprises:
setting the MSB part to indicate the end of the link list; and
setting the LSB part by the checksum.

20. The link list processing method of claim 19, wherein the storage device comprises at least a first storage space allocated in a first address range and a second storage space allocated in a second address range, any link list is stored into the first storage space only, and the MSB part of the data pattern is different from a co-located MSB part of each address within the first address range.

21. A network switch, comprising:
a packet receiving circuit, arranged for receiving an input packet and deriving a plurality of first data chunks from the received input packet;
a link list processing apparatus, comprising:
a storage device; and
a link list controller, arranged to write link list information into the storage device to create a link list in the storage device, wherein the link list comprises a plurality of nodes associated with the first data chunks respectively, each node has a next node address field, the link list information includes a data pattern configured to indicate an end of the link list as well as auxiliary information, and the link list controller stores the data pattern into the next node address field of a link-tail node of the link list; and
a packet transmitting circuit, arranged for deriving a plurality of second data chunks of an output packet from the first data chunks according to the link list, and transmitting the output packet, wherein the packet transmitting circuit refers to the auxiliary information indicated by the link-tail node to perform packet processing when generating the output packet.

22. The network switch of claim 21, wherein the auxiliary information indicates a reception error of a data chunk of the input packet; and the packet transmitting circuit appends a predetermined error data chunk to the output packet when reading the link-tail node.

23. The network switch of claim 21, further comprising:
a checksum processor, arranged for calculating a checksum of the first data chunks;
wherein the link list controller sets the auxiliary information by the checksum; and when transmitting the output packet, the packet transmitting circuit verifies the second data chunks according to the checksum read from the link-tail node.

* * * * *